May 21, 1946.  E. R. LOWE  2,400,762
CHUCK
Filed Jan. 20, 1944

INVENTOR.
Earl R. Lowe.
BY
Harness, Dickey & Pierce
ATTORNEYS.

Patented May 21, 1946

2,400,762

UNITED STATES PATENT OFFICE 2,400,762

CHUCK

Earl R. Lowe, Detroit, Mich.

Application January 20, 1944, Serial No. 518,929

2 Claims. (Cl. 279—76)

The present invention relates to a chuck particularly adapted for use as a drill chuck in combination with a specially constructed drill adapter. It is contemplated that a plurality of adapters will be employed, one adapter for each size of drill, and that the adapters will be of identical construction except for the size of the opening to receive the drill stem.

It is the general object of the present invention to provide an improved chuck and drill adapter construction incorporating a novel means for engaging and driving the drill. The locking or driving means of the present invention, as is common practice, comprises a retaining element such as a ball movable within an opening in the chuck body adapted to project into a recess formed in the drill adapter to provide the necessary driving connection.

A more particular object of the present invention is to provide a mechanism of the type described in which the torque driving load upon the element or ball is a pure compression load as distinguished from a load that would impose shear stresses.

Another object of the invention is to provide a device of the type described which is exceedingly simple and inexpensive to manufacture.

A further object is to provide a device in which the torque load imposed upon the locking elements is not transmitted to the release sleeve of the chuck.

Other objects and advantages of the invention will become apparent from the following specification, the accompanying drawing, and the appended claims.

In the drawing

Figure 1:
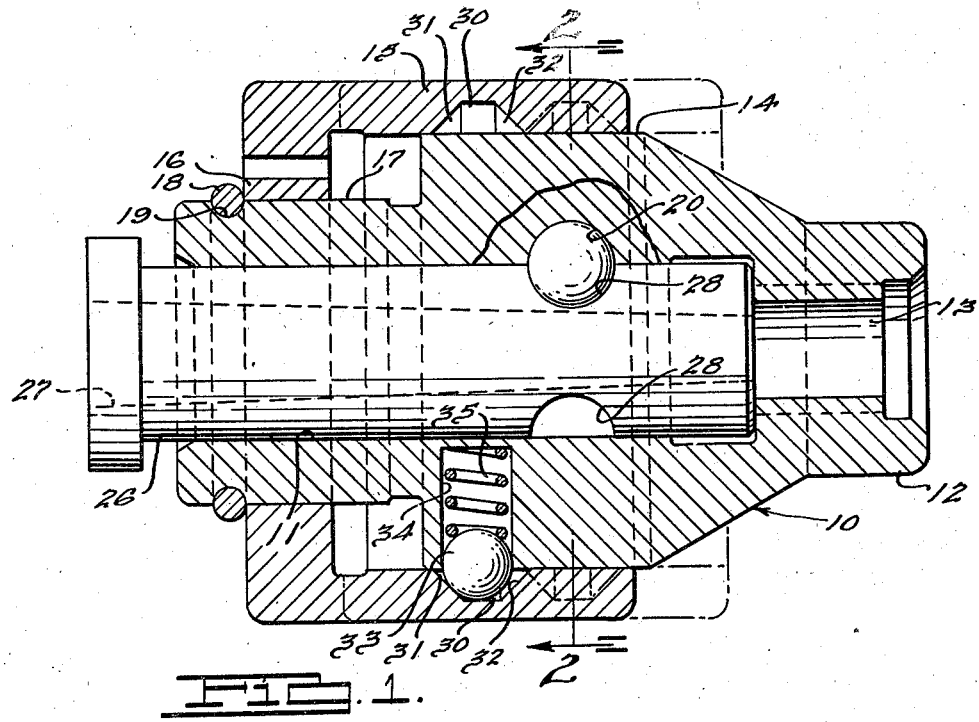
Figure 1 is a longitudinal section of the improved chuck and adapter combination.

As shown in the drawing, the chuck comprises a body indicated generally at 10. The body is provided with a cylindrical axial opening 11 and a shank 12 having a reduced splined opening 13 by means of which it may be fixed to a driving spindle. Intermediate its ends the body is provided with an enlarged portion 14 of cylindrical form upon which is slidably mounted a release sleeve 15. The sleeve 15 has at its forward edge an inturned flange 16 which fits a cylindrical portion 17 of reduced diameter at the forward end of the body. A snap ring 18 fitted within a groove 19 in the body serves to limit axial movement of the sleeve 15 to the left as viewed in Figure 1. Movement of the sleeve in the opposite direction is limited by engagement of the sleeve flange 16 with the enlarged portion 14 of the body.

Figure 2:
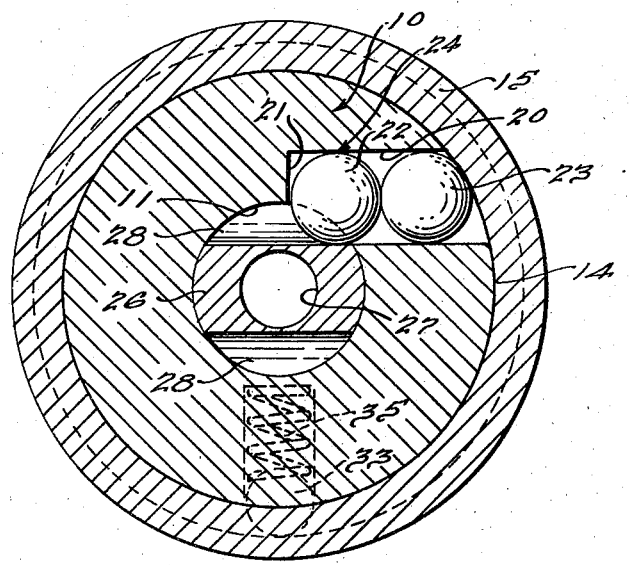
Figure 2 is a transverse section taken on the line 2—2 of Figure 1.

As best shown in Figure 2, the body is provided with a transversely directed cylindrical bore 20 which intersects the bore 11 and whose axis is displaced with respect to the axis of the bore 11. In the preferred construction illustrated, the axis of the bore 20 is substantially tangent to the bore 11. The bore 20 terminates with an end wall 21, and hence the bore provides a pocket adapted to receive a pair of balls 22 and 23 of substantially the same diameter as the bore but adapted to move freely therein. Wall 21 is so located that a point on the innermost ball 22 diametrically opposite to the point indicated by the arrow 24 in Figure 2, will be located within the bore 11 when the ball 22 contacts the end wall 21.

An adapter 26, having a cylindrical exterior, fits within the bore 11 and is provided with an internal tapered opening indicated at 27 in dotted lines in Figure 1 to receive a tapered drill stem not shown. The adapter 26 is provided with a pair of parallel grooves 28 located on opposite sides of the adapter and extending transversely thereof. The grooves 28 are of cylindrical contour, as best indicated in Figure 1.

When the adapter is in the position illustrated in the drawing the uppermost groove 28 is congruent to the cylinder defined by the bore 20 and in effect constitutes a partial continuation of the bore. The other groove 28 is similarly congruent if the adapter is rotated 180 degrees relative to the body from the position illustrated in the drawing.

The release sleeve 15 is provided with an internal annular groove 30 having a pair of inclined annular cam side walls 31 and 32. When the sleeve is in the position illustrated in the drawing the groove 30 is displaced axially of the chuck body with respect to the bore 20 and consequently the sleeve holds the balls 22 and 23 in the position illustrated, in which position the ball 22 has entered the uppermost groove 28 and serves to form a driving connection between the body and the adapter 26. The ball 23 serves merely as a filler between the sleeve and the ball 22. When the sleeve is in its locking position illustrated, a spring pressed ball 33 positioned within a bore 34 in the body and urged outwardly by means of a spring 35 engages in the groove 30 of the sleeve and thus retains the sleeve against axial displacement. To disengage the adapter it is only necessary to pull the sleeve to the right, as viewed in Figure 1, with respect to the body whereupon the inclined annular cam 31 will force the ball 33 out of the groove 30. When the flange 16 of the sleeve engages the enlarged portion 14 of the body the groove 30 will be in alignment with bore 20 as indicated in dotted lines in Figure 1, thus permitting the balls 22 and 23 to move outwardly and release the adapter. Such outward movement may be effected by centrifugal force if the chuck is rotating, otherwise it may be caused by a pulling force exerted on the adapter 26, since upon the imposition of such a force the groove 28 will cam the ball 22 to the right in bore 20, as viewed in Figure 2.

It will be observed that when the chuck is in the locking condition illustrated in the drawing, the torque load imposes pure compression forces upon the ball 22 since the adapter contacts the ball 22 at a point diametrically opposite the point 24 on the ball which engages the bore 20. Likewise, since the direction in which the torque load acts upon the ball is at 90° to the axis of the bore 20 there is no tendency of the torque load to force the balls outwardly against the release sleeve.

The mechanism is exceedingly simple and easy to manufacture, inasmuch as the groove 28 may be formed in a simple, straight boring or grinding operation. Two grooves are employed in order to facilitate locking of the chuck while the chuck is rotating relative to the adapter. Due to the arrangement of the locking grooves 28 the balls are free to move into locking position during a relatively large arc of movement of the adapter relative to the chuck body and consequently it is possible to lock a stationary adapter in a chuck which is rotating at speeds up to approximately 800 R. P. M.

It is apparent that there is provided in accordance with the present invention an exceedingly simple and useful quick-change chuck. While only one form of the invention is illustrated and described it will be apparent that variations in the details of the construction may be indulged in without departing from the spirit of the invention or the scope of appended claims.

What is claimed is:

1. In a quick-change chuck, a chuck body having an axial cylindrical opening, a cylindrical member adapted to fit said opening, a transversely directed cylindrical opening in the body intersecting the axial opening in offset relation to the axis of the body, said member having a transverse groove of cylindrical form which in one rotative position of the member relative to the body is congruent to a cylinder defined by said transverse body opening, a ball fitted in said transverse body opening and movable therein, said transverse opening having an inner end wall for limiting movement of said ball into said opening to a position in which diametrically opposite sides of the ball engage the bottom of said groove adjacent the periphery of the member and the wall of said transverse opening and a line through the center of the ball and normal to the axis of the axial opening extends at an oblique angle to the axis of the transverse opening such that centrifugal force tends to move the ball outwardly in said opening when the chuck is rotating, and releasable means for positively holding said ball in said position.

2. In a quick-change chuck, a chuck body having an axial cylindrical opening, a cylindrical member adapted to fit said opening, a transversely directed cylindrical opening in the body intersecting the axial opening in offset relation to the axis of the body, said member having a transverse groove of cylindrical form which in one rotative position of the member relative to the body is congruent to a cylinder defined by said transverse body opening, a ball fitted in said transverse body opening and movable therein, said transverse opening having an inner end wall for limiting movement of said ball into said opening to a position in which diametrically opposite sides of the ball engage the bottom of said groove adjacent the periphery of the member and the wall of said transverse opening and a line through the center of the ball and normal to the axis of the axial opening extends at an oblique angle to the axis of the transverse opening such that centrifugal force tends to move the ball outwardly in said opening when the chuck is rotating, and means for controlling the position of said ball comprising an axially movable sleeve on said body having an internal annular cam adapted on axial movement of the sleeve in one direction to move said ball into said position.

EARL R. LOWE.